Dec. 30, 1924.

J. W. KIMBROUGH

CULTIVATOR

Filed June 2, 1923

Inventor

J. W. Kimbrough

By William C Sinton

Attorney

Dec. 30, 1924.　　　　　　　J. W. KIMBROUGH　　　　　　1,520,824
　　　　　　　　　　　　　　　CULTIVATOR
　　　　　　　　　　　　Filed June 2, 1923　　　　　2 Sheets-Sheet 2

Inventor
J. W. Kimbrough

By William C. Linton
　　Attorney

Patented Dec. 30, 1924.

1,520,824

UNITED STATES PATENT OFFICE.

JOHN W. KIMBROUGH, OF HALEYVILLE, ALABAMA.

CULTIVATOR.

Application filed June 2, 1923. Serial No. 643,061.

*To all whom it may concern:*

Be it known that I, JOHN W. KIMBROUGH, a citizen of the United States of America, residing at Haleyville, in the county of Winston and State of Alabama, have invented certain new and useful Improvements in Cultivators; and I do hereby declare that the following is a full, clear, concise, and exact description of the invention, such as will enable others skilled in the art to which it appertains to make and use the same.

This invention relates to improvements in cultivators, having for an object the provision of an implement of this character wherein the structure is such as will permit of adjustment of several parts so that it may be used not only as a cultivator of the usual type, but also, in place of the specially constructed straddle row cultivator.

It is likewise an object of the invention to provide an implement of the above character in which the spring teeth or shovels and supporting members may be adjusted with respect to the plow beam, for usage as a harrow, or for purposes of ridging the earth along a row.

A further object of the invention is to provide an implement in which the spring teeth or shovels may be readily attached or detached by the operator through the use of ordinary tools.

Other objects will be in part obvious and in part pointed out hereinafter.

In order that the invention and its mode of operation may be readily understood by persons skilled in the art, I have in the accompanying illustrative drawings, and in the detailed following description based thereon, set out a preferred embodiment of the same.

Having more particular reference to the drawings, in connection with which like characters of reference will designate corresponding parts throughout, the cultivator may be broadly stated as comprising a plow or draw beam 6 provided at its rear end with handle members 7, and having a set of cross beams or supports 8 adapted to carry a number of rearwardly extending spring teeth or shovels 9.

Figure 1:
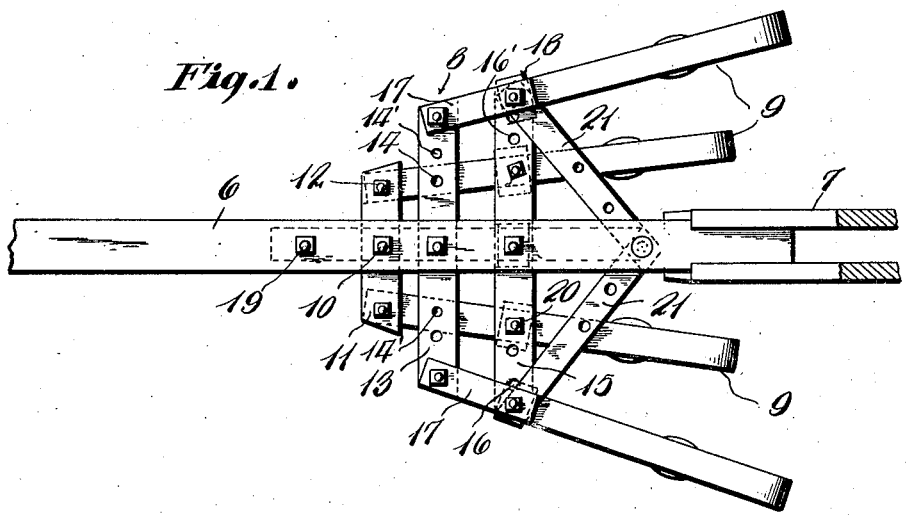
Figure 1 is a top plan view of the cultivator.
Figure 2:
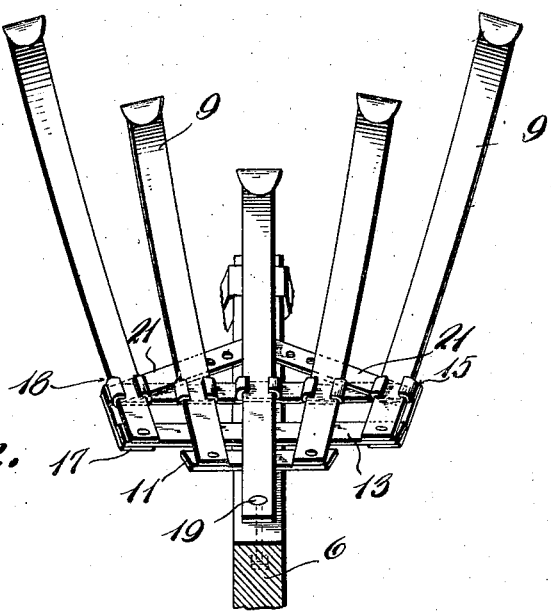
Figure 2 is a perspective view of the cultivator taken from the bottom, illustrating the unique manner in which the spring teeth or shovels are secured to the supporting bar.
Figure 4:
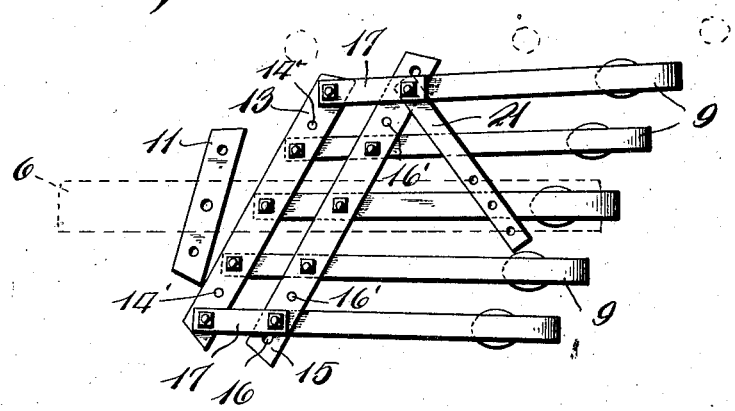
Figure 4 is a top plan view of the implement wherein the teeth are positioned for ridging the earth along a row; and, Figure 5 is a detail perspective view, illustrating the unique manner in which the individual spring teeth or shovels are secured to their supporting bars.

Although I may vary the number of teeth employed and consequently, the number of supporting bars, I have found it more practical to use an implement of this character constructed as I have illustrated, that is, a cultivator including the number of teeth and bars illustrated in Figures 1, 2 and 4.

In constructing a cultivator of this type, I secure to the under face of the plow beam 6, a set of cross beams or supporting bars 8, including, as shown, three bars arranged in parallel relation, each succeeding bar from the front to the rear being somewhat longer than the preceding one. Each of these bars is provided at its medial point with an aperture through which is passed attaching bolts 10, said bolts extending vertically through the plow or draw beam 6. The front cross bar 11 is provided adjacent its outer ends with an aperture for the purpose of receiving an attaching bolt 12 by which the forward ends of a pair of the spring teeth are connected to said cross bar 11. The adjacent cross bar 13, which, as heretofore stated, is somewhat longer than the front bar 11, is provided on each side of the plow beam 6 with a pair of spaced apertures 14 which are adapted to receive attaching bolts for the purpose of securing to said bar 13, the forward ends of the spring teeth 9. As will be understood by reference to the Figure 1 of the drawings, when the implement is to be used for one purpose or another, the place of attachment of the teeth to the supporting bars varies according to the particular work to be done by the implement. Formed in the bar 13 at points adjacent the apertures 14 are additional openings 14' which together with the apertures 16' in the rear bar provide means whereby the inner pair of teeth 9 may be spaced apart a greater distance than ordinarily. The next adjacent cross supporting bar 15, which is also longer than either of the two preceding bars, is provided at each side of the beam 6, preferably, with three apertures 16, the two apertures nearer the outer end of the bar being very close together, as shown, thus providing for an adjustment of the outer spring teeth as will be hereinafter described. For the purpose of lending rigidity to the supporting bars, I have connected the two longer bars at their outer ends with relatively short straps 17.

Figure 5:
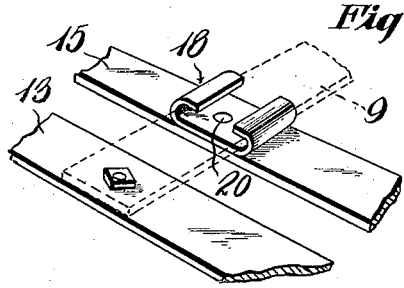

In order to provide for ready attachment and detachment of the spring teeth or shovels, I employ a set of substantially U-shaped clips 18, the parallel arms of which have their outer ends turned inwardly, whereby to take over the side edges of the spring teeth or shovels, when they are in operative position. As heretofore stated and clearly shown in the drawing, the extreme forward ends of the spring teeth or shovels 9 are securely and removably attached to the two forward cross bars and, except when the implement is used as a straddle row cultivator, the central tooth has its forward end secured to the plow beam 6 by means of a vertical bolt 19. By reference to Figure 2, this construction is very apparent. These clips 18 are preferably detachable by means of a bolt 20, as clearly shown in Figure 5 of the accompanying drawings.

In order that the cultivator may be efficiently used, it is necessary that the several parts be retained in proper relative positions with respect to the plow beam 6, in view of which I have provided a pair of braces 21 which extend from the outer ends of the rear cross bar 15 to the draw bar or beam 6, as shown in Figure 1, said bars being provided with a set of spaced apertures whereby to provide for attachment to the plow beam when the spring teeth or shovels are in any of the several adjusted positions.

When the implement is to be used as an ordinary cultivator the parts, as shown in Figure 1 of the drawings, are so positioned that the spring teeth or shovels diverge rearwardly to such an extent that the supporting cross beams terminate at points inside of the lines of travel of the outer spring teeth 9. Through this arrangement of the teeth and supporting bars, it is readily appreciated that in use, it will be impossible for the supporting bars to strike and injure the plants being cultivated and the general arrangement of the parts greatly facilitates the use of the implement when working around stumps, trees, and the like.

Figure 3:
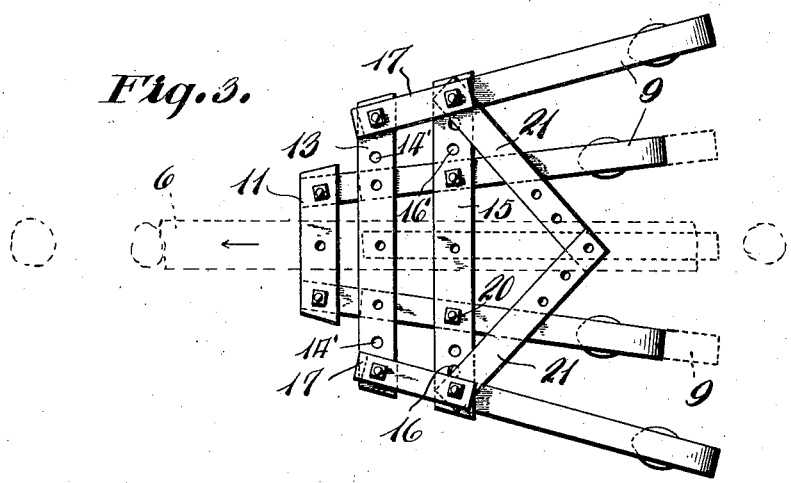
Figure 3 is a top plan view of the cultivator, illustrating in full lines its use as a straddle row cultivator, the central tooth being removed; the dotted line position of the parts showing the implement when it is used as a harrow.

As a general rule, it is the practice of the farmer to keep on hand several implements, in order that he may cultivate, harrow, or work in the several necessary ways, the soil between and around the rows. Through the construction of an implement such as described, I have provided a cultivator which may be used in the ordinary manner and which by the removal of the central tooth may be used as a straddle row cultivator, by means of which simultaneous working of the soil on either side of the row is possible. In dotted lines in Figure 3 and in full lines in Figure 4, I have illustrated a cultivator wherein the forward ends of the spring teeth or shovels are secured to the central transverse supporting bar, through which arrangement I provide an implement which may be used as a harrow, or, as indicated in Figure 4, as an implement for ridging up earth alongside a row. In Figure 4, the outer spring teeth have been shifted from their normal position, so as to bring the spring teeth into a more nearly parallel position, thus providing for a closer and more through working of the soil alongside a row.

Manifestly, the construction shown is capable of considerable modification, and such modification as is within the scope of my claim, I consider within the spirit of my invention.

I claim:

A cultivator comprising a draw beam, three transverse supporting bars arranged upon the under side of said draw beam, a set of substantially U-shaped retaining clips arranged adjustably in spaced relation on the lower face of the rear bar, and a set of spring tooth shovels having their forward portions received in said clips and the extreme ends secured to the advance bar of said draw beam.

In witness whereof I have hereunto set my hand.

JOHN W. KIMBROUGH.